No. 720,978. PATENTED FEB. 17, 1903.
C. J. SPECHT & C. R. KRUEGER.
ELECTRIC VEHICLE BRAKE.
APPLICATION FILED JUNE 7, 1902.
NO MODEL. 2 SHEETS—SHEET 1.
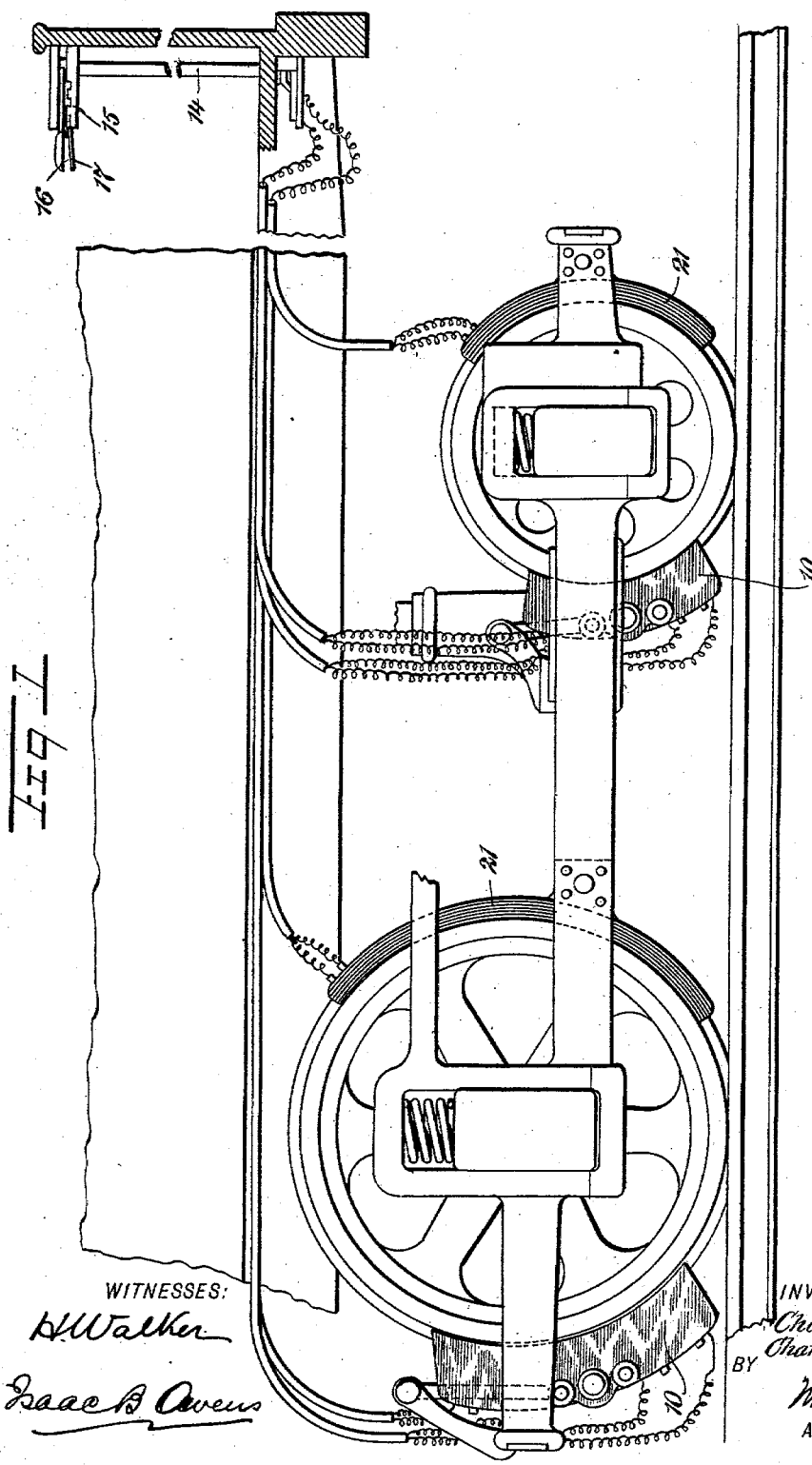
WITNESSES:
H. W. Walker
Isaac B. Owens
INVENTORS
Charles J. Specht
Charles R. Krueger
BY
ATTORNEYS

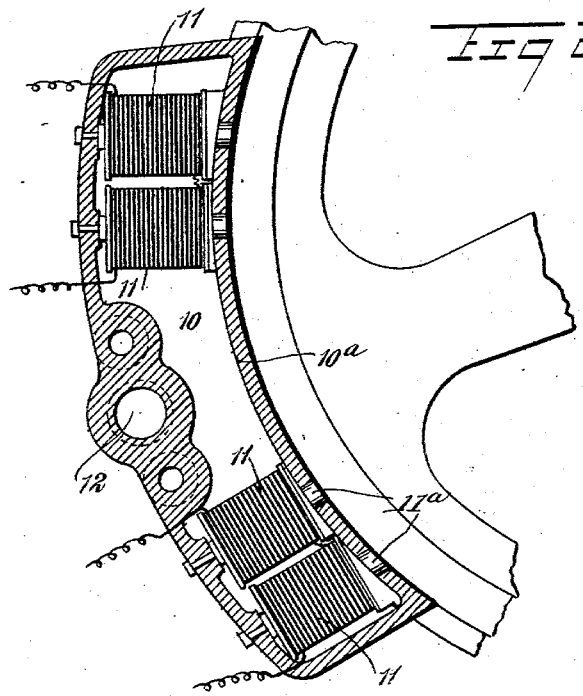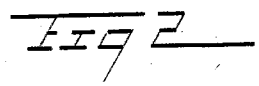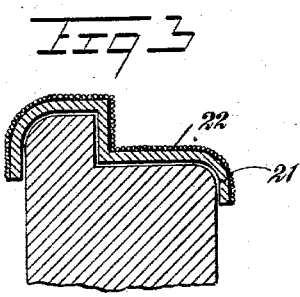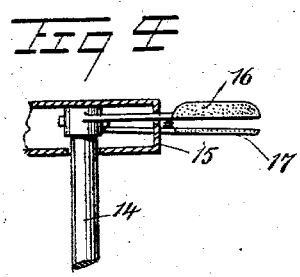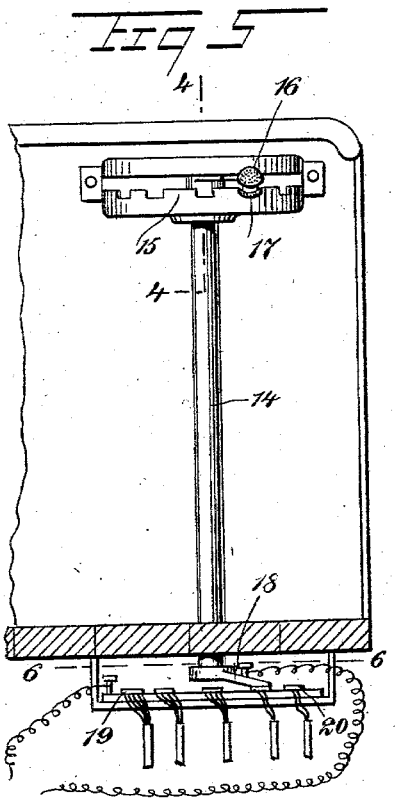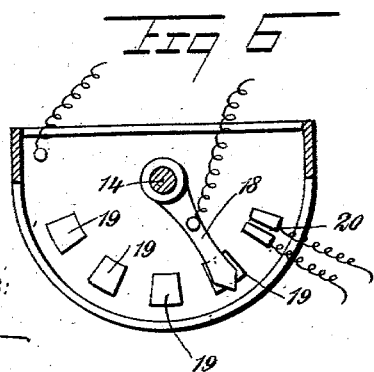

UNITED STATES PATENT OFFICE.

CHARLES J. SPECHT AND CHARLES R. KRUEGER, OF NEW YORK, N. Y.

ELECTRIC VEHICLE-BRAKE.

SPECIFICATION forming part of Letters Patent No. 720,978, dated February 17, 1903.

Application filed June 7, 1902. Serial No. 110,640. (No model.)

*To all whom it may concern:*

Be it known that we, CHARLES J. SPECHT and CHARLES R. KRUEGER, citizens of the United States, and residents of the city of New York, borough of Manhattan, in the county and State of New York, have invented new and useful Improvements in Electric Vehicle-Brakes, of which the following is a full, clear, and exact description.

This invention relates to an electric brake for vehicles. It is particularly adapted for use on electrically-driven street-cars, and it comprises a shoe which forms the pole of an electromagnet and which upon the energization of the magnet attaches itself to the wheel, thus tending to retard the revolution thereof. Further, the shoe communicates its magnetism to the wheel, and this in turn tends to adhere to the rail, so that a double braking power is attained. We have also provided a means for reducing the residual magnetism in the wheel after the electromagnet of the brake-shoe has been deënergized, thus to prevent the wheel from becoming permanently magnetized.

This specification is an exact description of one form of our invention, while the claims define the actual scope thereof.

Reference is to be had to the accompanying drawings, forming a part of this specification, in which similar characters of reference indicate corresponding parts in all the views.

Figure 1 is a side elevation of the invention, showing it applied to a car, parts shown in said view being in section. Fig. 2 is an enlarged sectional view of the electromagnetic shoe. Fig. 3 is an enlarged cross-section of the shell for reducing the residual magnetism, said view showing the shell in position with respect to the tread of the wheel. Fig. 4 is a detail view of the controller-lever with parts in section on the line 4 4 of Fig. 5. Fig. 5 is an elevational view of the controller, and Fig. 6 is a sectional plan view on the line 6 6 of Fig. 5.

We prefer to apply the improved brake-shoes and other mechanism of the invention to the ordinary brake-gear of the car, so as to permit the application of the brakes by hand whenever desired.

We have not shown the brake-gear in the drawings, since this forms no part of our invention.

As best shown in Fig. 2, the shoe 10 is constructed in the form of a metallic casing with removable portions at any desired point, so as to permit the insertion of the electromagnets 11. These magnets have bolts $11^a$ projected through the inner or working face of the casing.

12 indicates the pin-bearings by which the shoe is mounted on the brake-gear, as usual. The entire shoe may be constructed of magnetic material, such as soft iron, or the working face $10^a$ thereof alone may be constructed of this material. Now it will be seen that upon the energization of the magnets 11 the shoe itself will become energized and will cling to the wheel the same as though it were applied by the usual brake-gear. Also the magnetism of the shoe will be transmitted to the wheel, and the wheel itself will then tend to cling to the rail on which it runs. This effectually brakes the wheel.

The number and form of the magnets in the shoe is immaterial, this matter depending upon the size of the shoe and the wheel to which it is applied. In Fig. 2 two pairs of magnets are shown, one at each end, this shoe being adapted to large sizes of wheels. For smaller wheels one pair of magnets might be used.

The magnets may be controlled by any suitable means for switching on and off the current. In Figs. 4, 5, and 6 we have shown a controller comprising a shaft 14, at the top of which is a stationary quadrant 15, and over this quadrant works a hand-lever 16, with a spring-dog 17 coacting with the quadrant, so that upon throwing this lever the shaft 14 will be turned.

18 indicates a contact-arm carried by the lower end of the shaft 14, this contact-arm playing over four contacts 19, connected with the magnet, and a pair of contacts 20. The contacts 19 are in connection with the various electromagnetic brake-shoes, so that by throwing the arm 18 from one contact to the other one or more or all of these shoes may be brought into action. Thus by throwing the contact-arm 18 into the position shown in Fig. 6 only one brake-shoe will be active, and by throwing the contact-arm entirely over into engagement with the leftwardmost contact 19 all of the magnetic shoes will be in action.

After the magnets are deënergized and the car is again started it is advisable to remove from the wheel such residual magnetism as may be present therein. This is effected by means of a shell 21, which is held stationary on the truck of the car, closely against the periphery of each wheel, as shown in Fig. 1. These shells are covered with wires, as indicated at 22, and these wires are part of a circuit including the contacts 20 of the controller and any source of an alternating current—for example, a small alternator on the car. When the brakes are to be released and the car started, the contact-arm 18 should be moved into engagement with the contacts 20, thus bridging these contacts and energizing the wires 22, and then the residual magnetism is removed by the action of the alternating current passed through the wires 22 of the shell 21, causing the magnetic poles of the wheel to be rapidly changed.

When the brakes are to be released, the contact-arm 18 should be thrown fully over to the right, causing the contacts 20 to be bridged, thus not only cutting out the magnets of the shoes, but closing the circuit of the wires 22 and removing the residual magnetism from the wheel.

Various changes in the form and details of our invention may be resorted to at will without departing from the spirit of our invention. Hence we consider ourselves entitled to all forms of the invention as may lie within the intent of our claims.

Having thus described our invention, we claim as new and desire to secure by Letters Patent—

1. In a vehicle-brake, the combination with the wheel and with a magnetic shoe therefor, of a metallic body, a winding of wire thereon, and means for connecting said winding with the source of an alternating current.

2. In a vehicle-brake, the combination with the wheel and with a magnetic shoe therefor, of a means for reducing the residual magnetism in the wheel after the release of the brakes, said means comprising a shell lying adjacent to the periphery of the wheel, wires carried thereon, and means for connecting said wires with a source of an alternating current.

3. A shoe for electric vehicle-brakes, comprising a metallic casing, and magnets located within the casing and having cores projected through orifices in the inner or working face thereof.

In testimony whereof we have signed our names to this specification in the presence of two subscribing witnesses.

CHARLES J. SPECHT.
    CHARLES R. KRUEGER.

Witnesses:
    MORRIS HILLQUIT,
    FRANK M. HILL.